Feb. 29, 1944.   K. H. EVJEN ET AL   2,342,627
APPARATUS FOR MAKING GEOPHYSICAL EXPLORATIONS
Filed Jan. 8, 1942
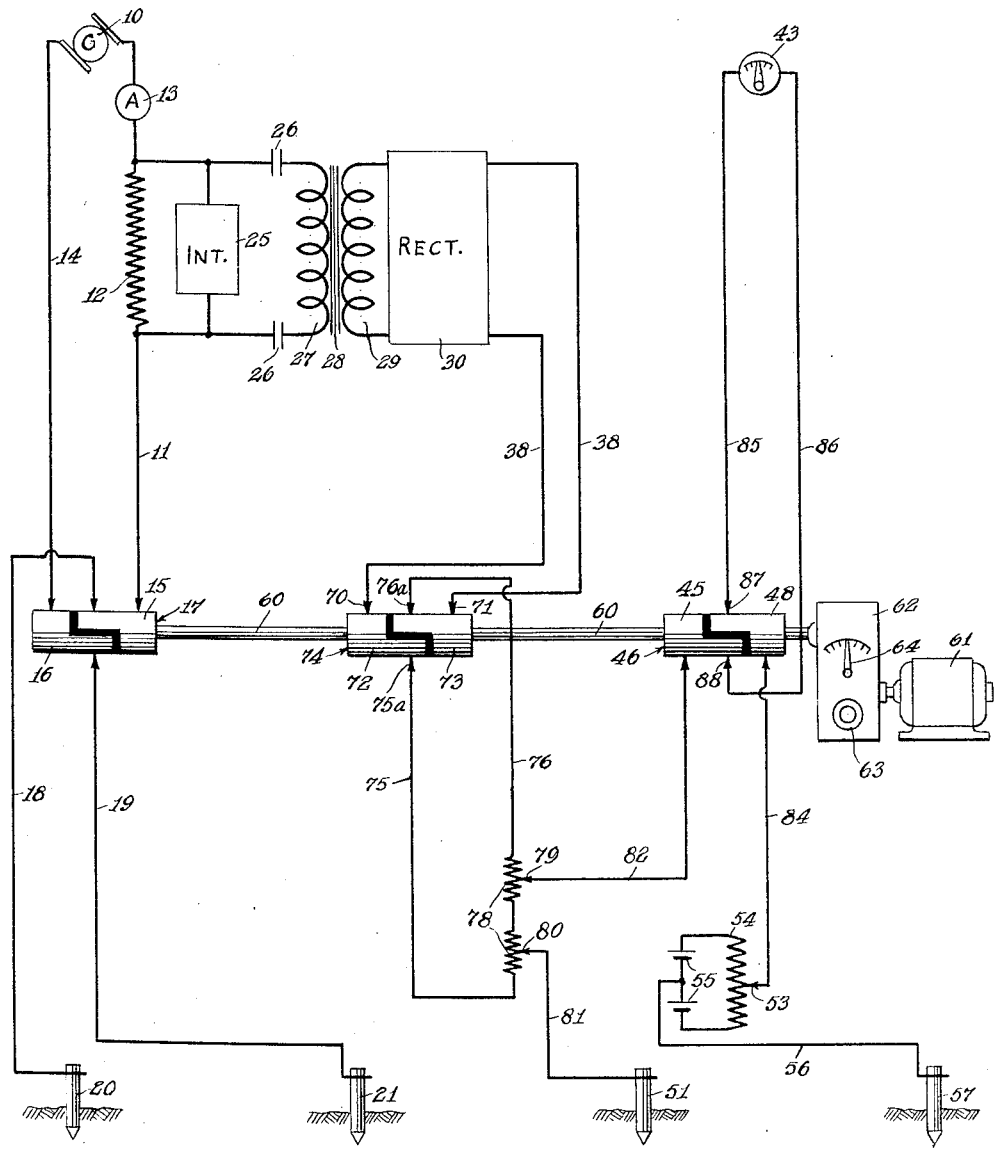
INVENTORS.
KNUTE H. EVJEN AND
HAAKON M. EVJEN
BY
ATTORNEY.

Patented Feb. 29, 1944

2,342,627

UNITED STATES PATENT OFFICE 2,342,627

APPARATUS FOR MAKING GEOPHYSICAL EXPLORATIONS

Knute H. Evjen and Haakon M. Evjen, Houston, Tex., assignors to Nordel Corporation, Houston, Tex., a corporation of Delaware Application January 8, 1942, Serial No. 425,993

3 Claims. (Cl. 175—182)

This invention relates to a method of electrical prospecting and to an apparatus for carrying out the same and is an improvement on the system disclosed in a patent to Knute Evjen, No. 2,294,-395, dated Sept. 1, 1942, which embodies an earth current circuit including a current source and a controlled reversing means for passing a current reversed at a predetermined controlled low frequency through the earth between spaced earth electrodes, and a potential circuit including potential pick-up electrodes located at spaced points adjacent the earth's surface and lying within the field of influence of the earth current. The potential circuit is provided with reversing means synchronized with the first reversing means for converting the picked-up potential into a unidirectional potential suitable for actuating a direct current measuring instrument such as a galvanometer. The earth current circuit and the potential circuit are coupled by a coupling circuit which includes means for producing a potential drop proportional to the total current flowing in the earth current circuit and for balancing a controllable portion of this potential drop against the picked-up potential so as to obtain, by a single reading, a measurement which indicates directly the earth's apparent resistivity.

An object of this invention is to provide a novel and improved system of the type above indicated.

Another object is to provide a novel and improved coupling circuit in a system of the above type.

Various other objects and advantages will be apparent as the nature of the invention is more fully disclosed.

Although the novel features which are believed to be characteristic of this invention are more particularly pointed out in the claims appended hereto, the invention itself may be better understood by referring to the following description, taken in connection with the accompanying drawing, in which certain specific embodiments thereof have been set forth for purposes of illustration.

In the drawing:

The figure is a schematic representation of an electrical prospecting system embodying the present invention.

Referring to the drawing, the earth current circuit comprises a source 10 of direct current, such as a generator or battery. The source 10 is connected in series circuit with a line 11, a resistance 12, an ammeter 13 and a line 14. Lines 11 and 14 are connected to segments 15 and 16 respectively of a commutator 17 which is driven by suitable means to be described. Alternating current is taken from the commutator 17 by means of lines 18 and 19 respectively which are connected to suitable ground electrodes 20 and 21 herein referred to for convenience as current electrodes. The current electrodes 20 and 21 are spaced a convenient distance apart, which may be of the order of several thousand feet, and when the commutator 17 is driven at a suitable speed, an alternating current having a frequency corresponding to the speed of rotation of the commutator, passes through the earth circuit. This current may be measured by the ammeter 13 and may be adjusted within desired limits by suitable regulation of the source 10.

It will be noted that a potential drop is built up across the resistance 12 which is directly proportional to the current flowing in the earth circuit. This potential drop is utilized in the present system for obtaining the measuring potential. For this purpose, an interrupter 25 is connected across the resistance 12 and the opposite ends of said resistance are connected through condensers 26 to the primary 27 of the transformer 28. The interrupter 25 periodically short circuits the resistance 12 and thereby produces a variable potential across the primary of the transformer 27 which produces an alternating current in the secondary 29 thereof. The interrupter 25 may operate at any desired frequency, dependent upon the characteristics of the transformer 28. A frequency of the order of 500 per second has been found suitable, although it is to be understood that various other frequencies may be employed. The condensers 26 should be of sufficiently high capacity to efficiently pass currents of this frequency or may be omitted in certain instances. In the present embodiment, the condensers prevent the direct current from passing through the primary of the transformer and saturating the magnetic circuit thereof. They also prevent a direct metallic connection between the transformer and the earth current circuits.

The alternating current induced in the secondary 29 is rectified by a suitable rectifier 30 which may be of any desired type, such, for example, as a space discharge rectifier or a chemical rectifier, such as a copper oxide rectifier. The direct current output of the rectifier 30 is connected by lines 38 to brushes 70 and 71 which engage respectively segments 72 and 73 of a commutator 74. Reversing contacts 75a and 76a of the commutator 74 are connected by lines 75 and 76 to a potentiometer 78 having adjustable taps 79 and 80. The tap 80 is connected by a line 81 to a potential pick-up electrode 51. The tap 79 is connected by a line 82 to a segment 45 of a commutator 46. The segment 48 of the commutator 46 is connected by line 84 to a variable tap 53 of a voltage divider resistance 54 which is connected across a battery 55, the midpoint of which is connected by a line 56 to the other potential pick-up electrode 57. Reversing brushes 87 and 88 of the commutator 46 are connected by lines 85 and 86 to a direct current galvanometer 43.

The commutators 17, 74 and 46 are mounted on a shaft 60 which is driven, through a suitable gear train indicated at 62, by a motor 61 having a speed control device 63 and an indicator 64 to indicate the speed of operation thereof.

The galvanometer 43 is preferably of the highly damped type so that it is influenced only by the direct current component and not by any ripple or other alternating current component in the circuit under measurement.

Operation

In the operation of this system, the current electrodes 20 and 21 are located at selected points in the earth and the potential electrodes 51 and 57 are located at points within the field of influence of the earth currents produced between the current electrodes. The source 10 is adjusted to pass a predetermined amount of current through the earth circuit, as indicated by the ammeter 13. The frequency of alternation of the current is regulated by making suitable adjustment of the control handle 63. If the measurements are to be taken with direct current, the commutator 17 remains stationary. For low frequency alternating current, the commutator is slowly rotated at the selected speeds as indicated by the speed indicator 64. It will be noted that the potential drop in the resistance 12 will vary in proportion to the amount of current flowing in the earth circuit. The interrupter 25, by intermittently bridging this resistance 12, causes a pulsating current to flow in the primary of the transformer 28 which bears a definite relationship to the amount of current flowing in the earth circuit. The value of the resistance 12 is so chosen that only a small fraction of the total current flowing in the earth circuit is converted into pulsating current. It may have a value, for example, of from 1 to 20 ohms. The pulsating current thus produced may, for example, correspond to about 1% of the earth current. The alternating current in the secondary of the transformer 28 is rectified by the rectifier 30 to produce a direct current.

The direct current derived from the rectifier is reversed by the commutator 74 to produce in the potentiometer 78 a potential drop which is reversed in synchronism with the earth current and, consequently, in synchronism with the potential picked up by the pick-up electrodes 51 and 57 and is applied to the potential circuit in a direction to oppose the picked-up potential.

The potential derived from the potential pick-up electrodes 51 and 57 is balanced against the potential taken from the potentiometer 78, is rectified by the commutator 46, and applied as a direct current to the galvanometer 43.

In certain instances, suitable filters may be incorporated in the rectifier circuit to eliminate the ripple and produce a uniform direct current, or the same effect may be obtained by using a highly damped galvanometer 43. Inasmuch as there is no direct ohmic connection between potentiometer 78 and the earth current circuit except through the earth itself, the potential developed across the potentiometer may be used to measure the potential difference existing between the potential electrodes 51 and 57.

With the circuit operating in this manner, suitable adjustments are made of the contacts 79 and 80 to produce a zero reading on the galvanometer 43 which indicates that the average voltage drop across the intermediate portion of the potentiometer 78 between the contacts 79 and 80 exactly balances the potential which is picked up by the earth potential electrodes 51 and 57.

The effect of any residual earth current which would tend to produce a constant direct potential across the electrodes 51 and 57 is eliminated by suitable adjustment of the potentiometer 54. This adjustment may be made, for example, while no current is flowing through the earth circuit so that the only effect on the galvanometer 43 represents the effect of the residual earth current. Since the earth current impresses a direct current potential across the probe (or potential) electrodes, any unbalance between this potential and the potential taken from potentiometer 54, will appear as an alternating potential after commutation by commutator 46. This will make the galvanometer kick from one side to the other in synchronism with the commutation. Any drift in the natural earth potential may thus be immediately perceived, and can be compensated by readjusting potentiometer 54 until the picking of the galvanometer is eliminated.

A filter may be included in the measuring circuit if desired in order to eliminate ripples or fluctuations from various causes such, for example, as those produced by the action of the commutators.

The potentiometer 78 may be suitably graduated in convenient units and when the balance is obtained, the reading corresponding to the point of adjustment is noted. The frequency is also noted from the indicator 64. The potential developed across the potentiometer 78, being dependent upon the total value of the earth current at the instant that the measurement is being taken, automatically compensates for any variations in electrode resistance or in contact resistance and eliminates any necessity for making simultaneous measurements of the earth current and the induced potential.

This measurement is repeated with different frequencies until a complete potential spectrum of the area between electrodes 51 and 57 is obtained. These electrodes may then be moved to another location and the measurements repeated to obtain a potential spectrum at various frequencies in the manner above pointed out. The various spectra thus obtained may be interpreted to show the characteristics of the earth's strata in the area under investigation. It is to be understood, of course, that the potential electrodes may be variously positioned with respect to the current electrodes 20 and 21 and that the positions thereof may be changed in accordance with the depth which is under investigation at any particular instant.

It will be noted that in the above described system only a single reading need be taken and the necessity for mathematical calculations is avoided. The system is accordingly well adapted to field use and may be operated by unskilled persons. The data thus compiled may be interpreted by geological physicists in accordance with well known principles.

The size of the electrodes may vary over wide limits. In practice, metal stakes about one or two inches in diameter and 3 ft. or 4 ft. in length have been found satisfactory. The distance between the current electrodes may vary widely, for example, from 200 ft. to 5000 ft., depending upon the depth to be investigated. The potential of the source 10 may likewise be adjusted as desired. Voltages of 100 volts to 200 volts and earth currents of one to two amperes have been found satisfactory.

Although certain specific embodiments of the invention have been shown for purposes of illustration, it is to be understood that the invention is not to be limited thereto but that various changes and modifications may be made therein as will readily appear to a person skilled in the art. The invention is only to be limited in accordance with the scope of the following claims.

What is claimed is:

1. A system for electrical prospecting, comprising an earth current circuit including a source of direct current, a pair of spaced earth electrodes, and reversing means connected between said source and said electrodes for reversing the direct current at a predetermined controlled frequency whereby an earth current having a predetermined frequency is passed through the earth between said electrodes, a potential circuit including potential pick-up electrodes located at spaced points lying within the field of influence of said earth current, a direct current indicating device connected to indicate the potential of said potential circuit, and reversing means synchronized with said first reversing means and connected between said potential pick-up electrodes and said indicating device to convert the picked-up potential difference into a uni-directional potential suited to actuate said indicating device, and coupling means connected between said earth current circuit and said potential circuit to impress on said potential circuit a balancing potential which is directly proportional to the current flowing in said earth current circuit at the instant of measurement, said coupling means comprising a resistance connected in series with said earth current circuit on the direct current side of said first reversing means to carry a predetermined portion of the current in said earth current circuit and arranged to develop a potential drop proportional to the current flowing in said earth current circuit, a second resistor connected in said potential circuit on the alternating current side of said second reversing means, an interrupter connected to produce from said potential drop an alternating current, a transformer having a primary connected to receive said alternating current, a rectifier connected to rectify the current induced in the secondary of said transformer, and a reversing means synchronized with said first reversing means connected to reverse said rectified current and to supply the same to said second resistor, whereby the potential drop in said second resistor corresponds in direction to the potential picked-up by said potential pick-up electrodes and is directly related to the total current flowing in the earth current circuit at the instant of measurement.

2. The system set forth in claim 1 in which the three reversing means comprise commutators and driving means is provided for driving said commutators in synchronism.

3. The system set forth in claim 1 in which the three reversing means comprise commutators and driving means is provided for driving said commutators in synchronism, said driving means being adjustable in speed to vary the frequency of said commutators.

KNUTE H. EVJEN.
HAAKON M. EVJEN.